(12) United States Patent
Eppley

(10) Patent No.: US 8,308,488 B2
(45) Date of Patent: Nov. 13, 2012

(54) MODULAR TAXIDERMY MANNEQUIN EAR ASSEMBLY

(75) Inventor: Bryan L. Eppley, Millersburg, OH (US)

(73) Assignee: Ohio Taxidermy Supply, Inc., Millersburg, OH (US)

( * ) Notice: Subject to any disclaimer, the term of this patent is extended or adjusted under 35 U.S.C. 154(b) by 596 days.

(21) Appl. No.: 12/581,206

(22) Filed: Oct. 19, 2009

(65) Prior Publication Data

US 2011/0091857 A1  Apr. 21, 2011

(51) Int. Cl.
*G09B 23/00* (2006.01)

(52) U.S. Cl. ...................................... 434/295

(58) Field of Classification Search .................. 434/262, 434/267, 295, 296; 446/376, 384, 390, 391
See application file for complete search history.

(56) References Cited

U.S. PATENT DOCUMENTS

| 2,992,494 | A | * | 7/1961 | Jonas, Jr. ....................... 434/296 |
| 4,145,006 | A |   | 3/1979 | Webb |
| 4,515,340 | A | * | 5/1985 | Rinehart .......................... 249/96 |
| 4,775,323 | A | * | 10/1988 | Johnson ........................ 434/296 |
| 5,733,130 | A |   | 3/1998 | Eppley |
| 6,257,948 | B1 | * | 7/2001 | Silva .............................. 446/100 |
| 6,458,434 | B1 |   | 10/2002 | Coombs, Jr. |
| 6,799,974 | B2 |   | 10/2004 | Martin et al. |
| 2007/0190510 | A1 |   | 8/2007 | Johnson |

* cited by examiner

*Primary Examiner* — Kurt Fernstrom
(74) *Attorney, Agent, or Firm* — Sand & Sebolt

(57) ABSTRACT

The present invention is a taxidermy mannequin which includes an optional ear engagement area formed on a head portion, a lock plate which is secured to the ear engagement area, and an ear liner which is connected to the lock plate. The connection between the lock plate and the ear liner is such that a taxidermist may work with the ear and animal skin before securing the ear liner to the lock plate. Furthermore, a multiple ear butt system is provided where the taxidermist may select from multiple ear butts, wherein different ear butts position the ear in different orientations relative the head.

21 Claims, 7 Drawing Sheets

U S 8,308,488 B2

MODULAR TAXIDERMY MANNEQUIN EAR ASSEMBLY

BACKGROUND OF THE INVENTION

1. Technical Field

The invention relates generally to a taxidermy mannequin for modeling an animal skin. More particularly, the invention relates to an improvement in taxidermy mannequin ear support. Specifically, the invention relates to a modular taxidermy mannequin ear assembly whereby an ear liner is easily and adjustably attached to a head portion of the taxidermy mannequin without the use of adhesive or clay.

2. Background Information

Taxidermy is the act of mounting or reproducing dead animals for display (e.g. as hunting trophies) or for other sources of study. Taxidermy can be done on all species of animals including mammals, birds, reptiles, and amphibians. The methods that taxidermists practice have been improved over the last century, heightening taxidermic quality. The animal is first skinned in a process similar to removing the skin from a chicken prior to cooking. This can be accomplished without opening the body cavity so the taxidermist usually does not see internal organs or blood. The skin is tanned and repaired and then placed on a mannequin for assembling the mount.

Generally, the taxidermist sews and glues the animal skin to a mannequin so as to replicate a realistic body pose and shape of the animal. Typical taxidermy mannequins include an integrated body and head, with sockets for eyes. However, visible body parts which are not retained with the skin are replaced by artificial means, such as the teeth and eyes. In a modern deer head mount, for example, the only natural parts of the animal used are the antlers and the skin. All of the other organs and tissues are recreated with man-made materials. The eyes are made from glass, the eyelids are sculpted from clay, the soft tissues of the nose and mouth are sculpted from epoxy or wax, and the mannequin is made from polyurethane foam or other materials. Clay and glue are used to secure these items to the mannequin head. Ear liners are produced to replace the ear cartilage and slide into an ear sheath created by removing the cartilage. The protruding end of the ear liners are typically attached to the head by clay and glue.

Taxidermists spend a large amount of time cutting, applying clay, and gluing features to the mannequin to achieve a realistic animal look. Over time, clay and glue lose their shape and adherence to the mannequin and the overall realistic look of the mounted animal deteriorates. Taxidermists spend a large amount of this time particularly on the ear portion of an animal model. The ear liner must be inserted into the ear cavity of the animal skin, and then affixed to the mannequin while the skin is draped over the ear liner. The skin is typically connected in one large piece and is heavy and unwieldy when working on each ear. When the animal ear skin is satisfactorily attached to the ear liner, the end of the ear liner must be affixed to the mannequin head. The ear liner is heavy from draping the animal ear skin overtop and threading the ear liner through the ear sheath, making it hard to secure to the animal mannequin head. As discussed previously, clay and glue are used to secure the ear liner to the animal head, but this is an efficient process and leaves the ears susceptible to becoming detached from the mannequin head over time, destroying the look of the animal model.

BRIEF SUMMARY OF THE INVENTION

One aspect of the present invention is to provide a taxidermy mannequin ear assembly which is modular in nature and including elements which may be individually handled by the taxidermist to more easily form the animal ear skin around the model.

The present invention broadly comprises a modular taxidermy ear system which includes a lock plate having a first mount connector, an ear liner having a second mount connector, and an ear butt formed to receive a portion of the ear liner therethrough. The second mount connector is formed to engage with the first mount connector to secure the ear liner to the lock plate.

The present invention also broadly comprises multiple ear butts whereby different ear butts may be used with a single lock plate and a single ear liner to position the ear liner in different orientations.

BRIEF DESCRIPTION OF THE DRAWINGS

A preferred embodiment of the invention, illustrated of the best mode in which Applicant contemplates applying the principles, is set forth in the following description and is shown in the drawings and is particularly and distinctly pointed out and set forth in the appended claims.

Similar numbers refer to similar parts throughout the drawings.

DETAILED DESCRIPTION OF THE INVENTION

Referring to FIGS. 1-9, there is shown a modular taxidermy ear assembly in accordance with the present invention and generally indicated at 10.

Figure 2:
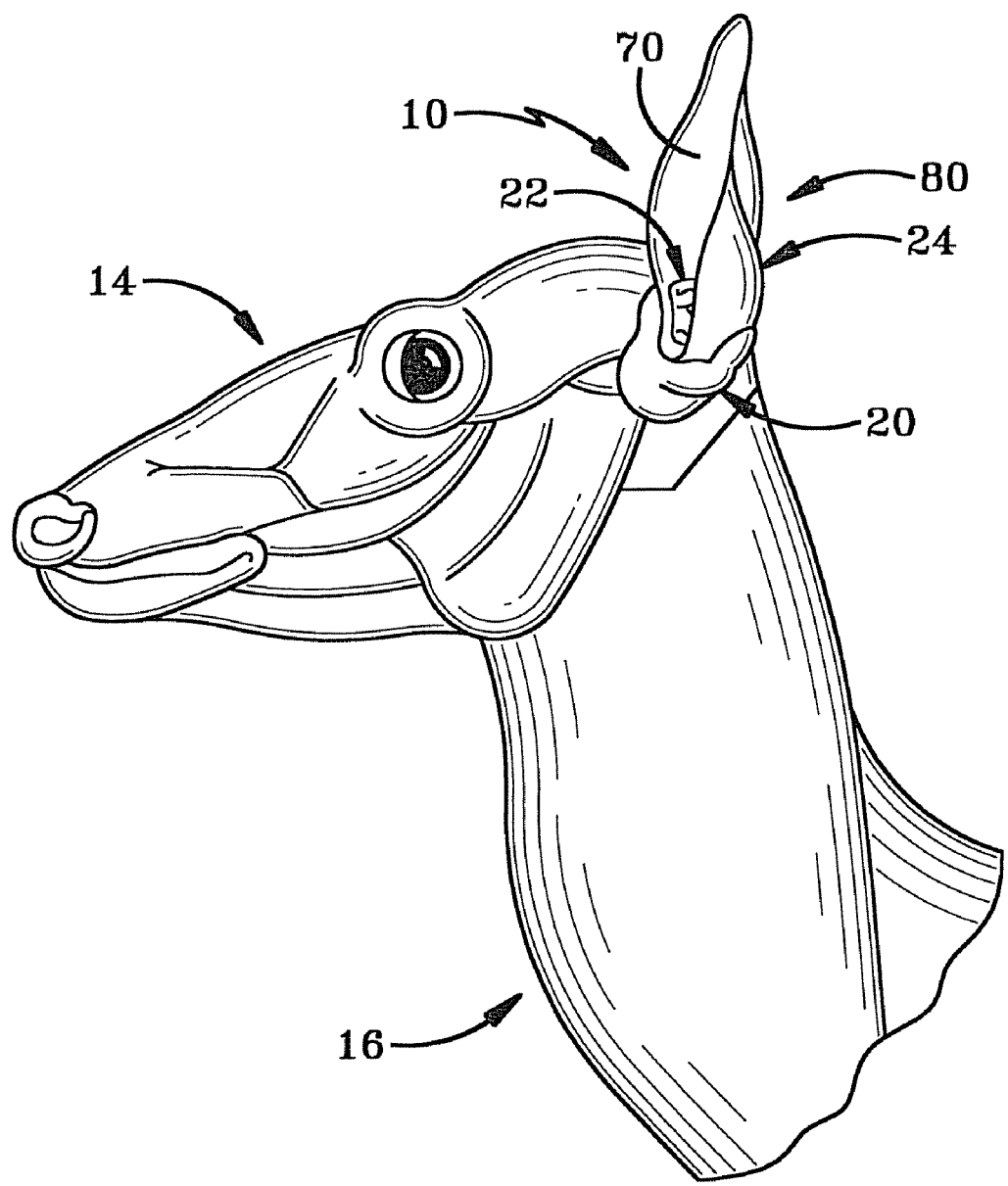
FIG. 2 is similar to FIG. 1 with the animal skin removed and a modular taxidermy mannequin ear assembly of the present invention secured to a head portion of the mannequin.
Figure 3:
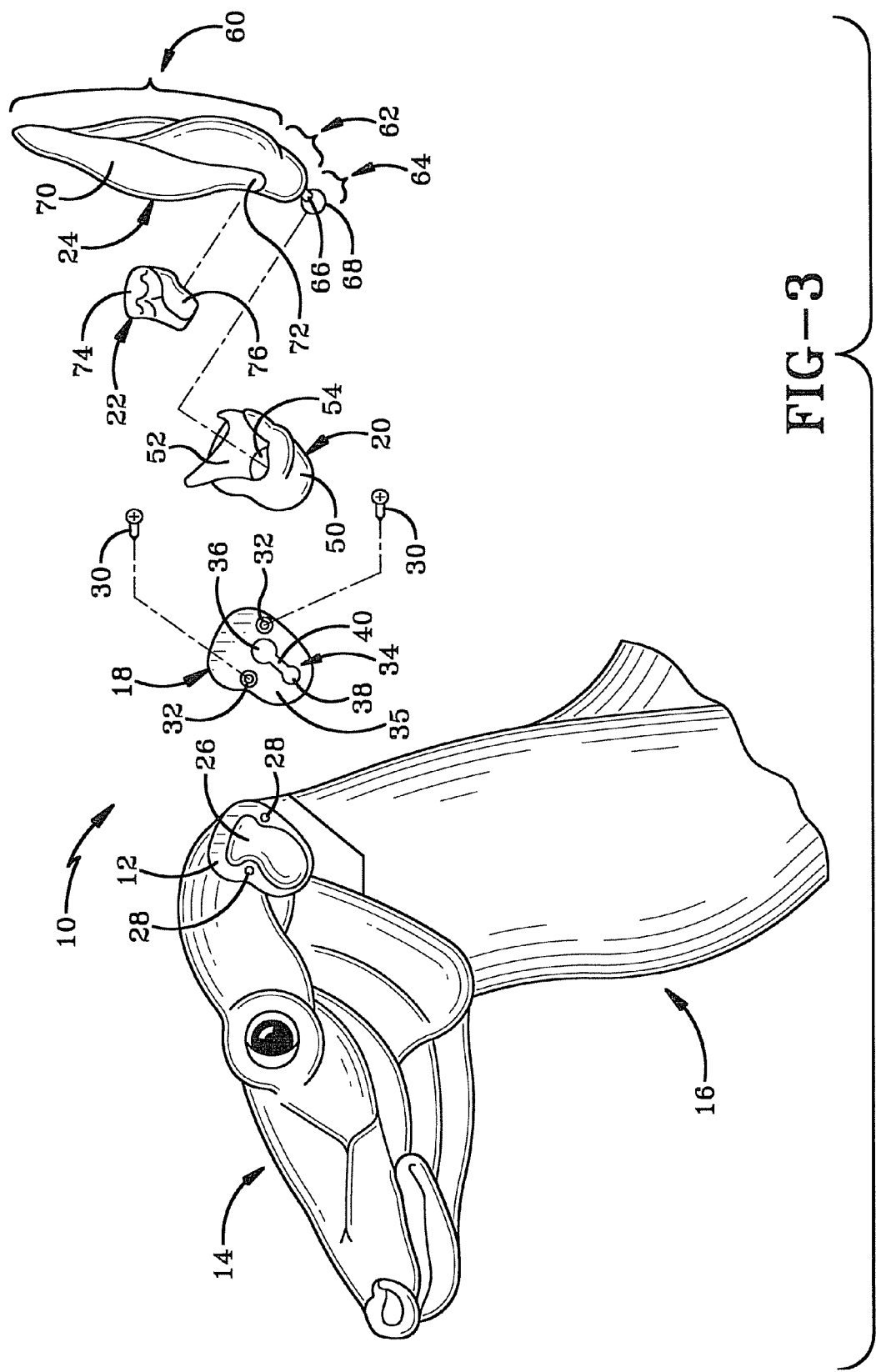
FIG. 3 is an exploded perspective view of the present invention.
Figure 4:
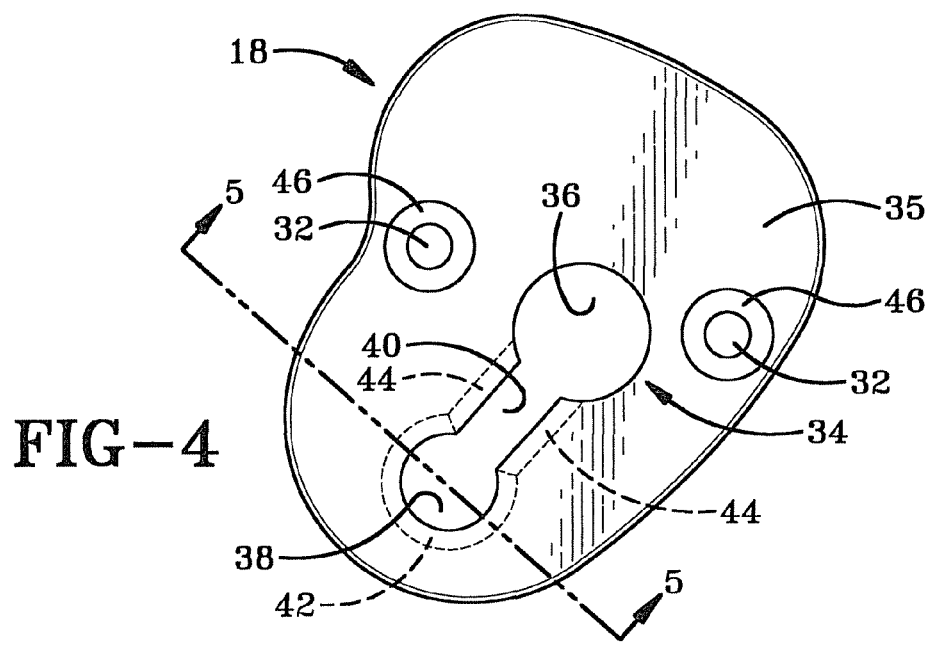
FIG. 4 is a top plan view of a lock plate of the present invention.
Figure 5:
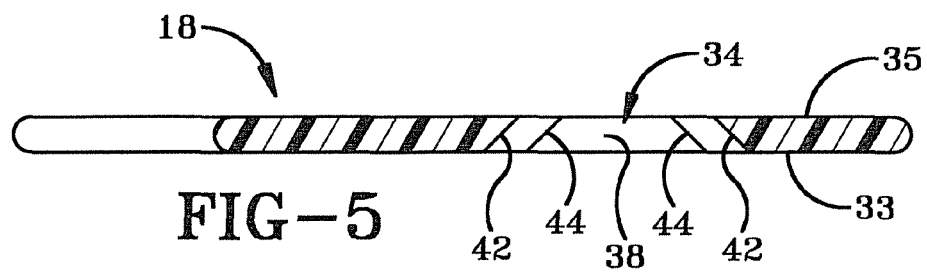
FIG. 5 is a view taken on line 5-5 of FIG. 4.
Figure 6:
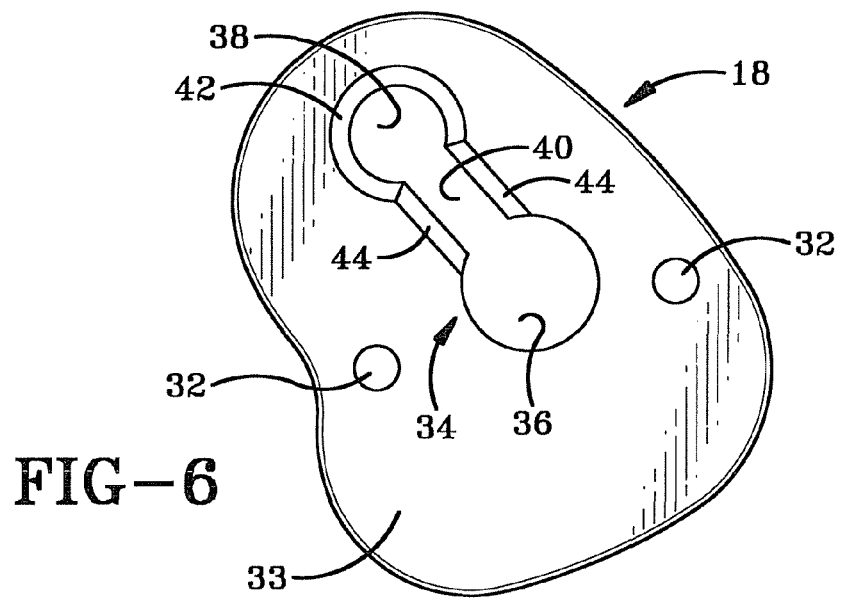
FIG. 6 is a bottom plan view the lock plate of the present invention.

As shown in FIGS. 2 and 3, a preferred embodiment of modular taxidermy assembly 10 includes an ear engagement area 12 formed on a head portion 14 of a taxidermy mannequin 16, a lock plate 18, an ear butt 20, a featured surface insert 22, and an ear liner 24. Ear engagement area 12 includes a recess 26 and a pair of holes 28, each sized to receive a screw 30 passed through a hole 32 included in lock plate 18 to secure lock plate 18 to ear engagement area 12.

As shown in FIGS. 3-6, lock plate 18 is formed in a generally flat, plate-like structure having a first side 33 and opposed second side 35. Lock plate 18 further includes a first mount connector 34, shown particularly in the preferred embodiment having female elements comprising a first aperture 36, a second aperture 38, and having a rail aperture 40 extending therebetween. Apertures 36, 38, and 40 are defined by lock plate 18 and are shown having a particular shape, but may be defined in any desired shape. An angled surface 42 and 44 is formed on first side 33 of lock plate 18, with angled surface 42 proximate second aperture 38 and angled surface 44 proximate rail aperture 40. An angled surface 46 is formed on second side 35 of lock plate 18 proximate each of holes 32.

Figure 7:
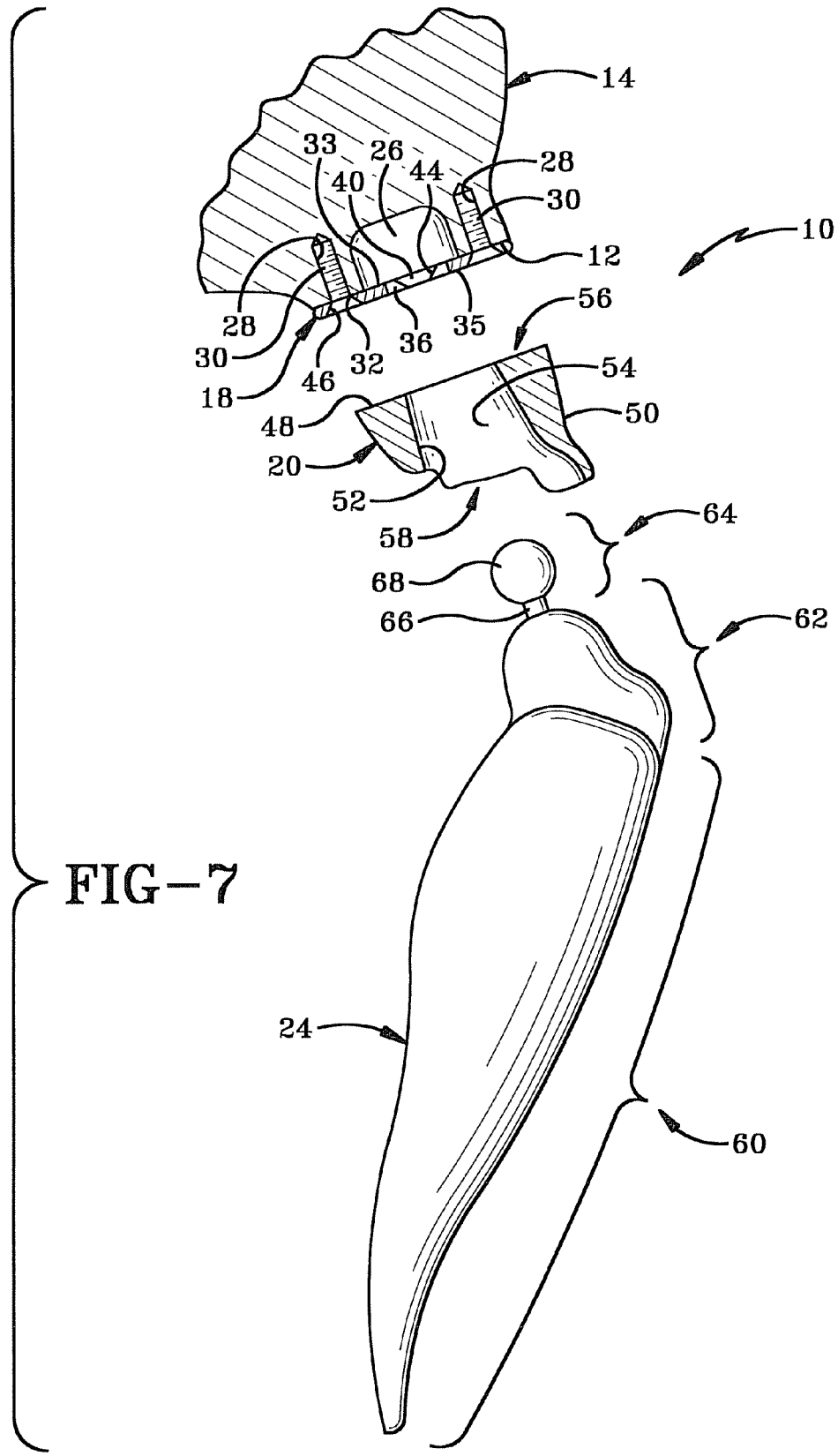
FIG. 7 is a side view of the present invention with parts shown in cross-section.
Figure 8:
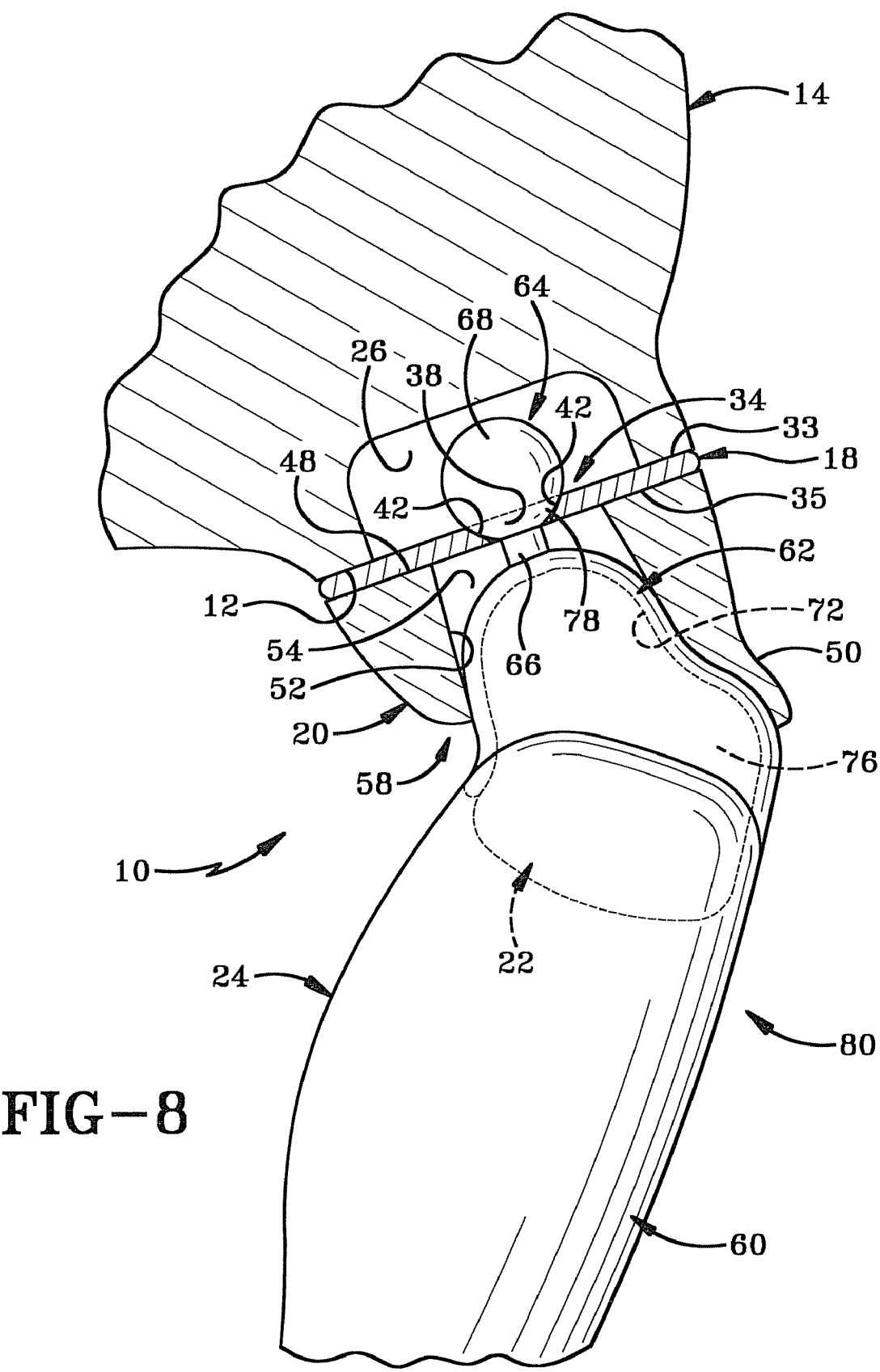
FIG. 8 is a cross sectional view of an ear liner and a ear butt of the present invention secured to the lock plate.
Figure 9:
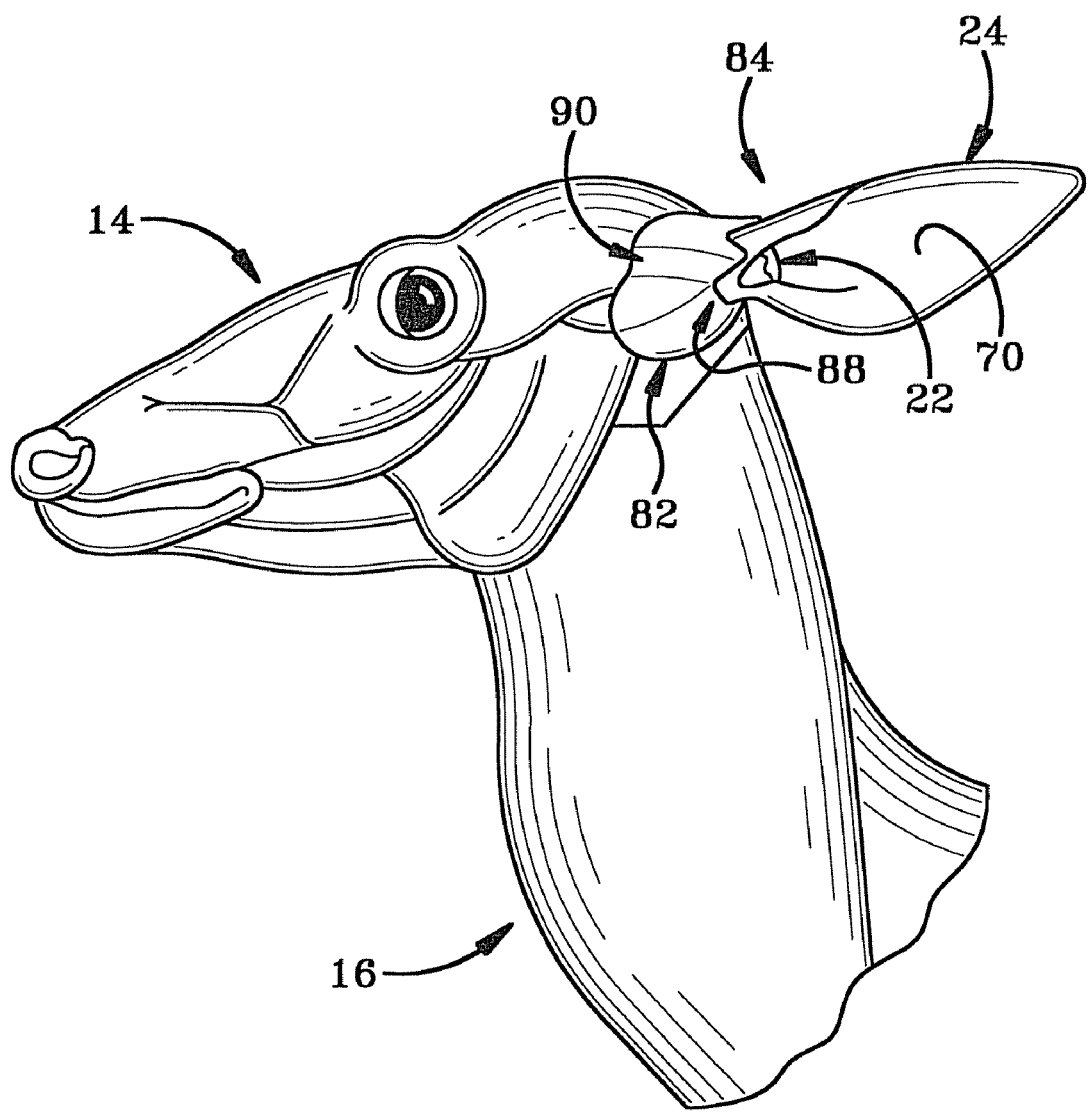
FIG. 9 is a side profile view similar to FIG. 2, having a different ear butt and ear liner orientation.

As shown in FIGS. 7-9, ear butt 20 includes a flat surface 48, an outer contoured surface 50 extending from flat surface 48, and an inner surface 52 extending from flat surface 48 and defining a channel 54. Channel 54 extends entirely through ear butt 20 and generally from a first side 56 of ear butt 20 to a second side 58.

Figure 1:
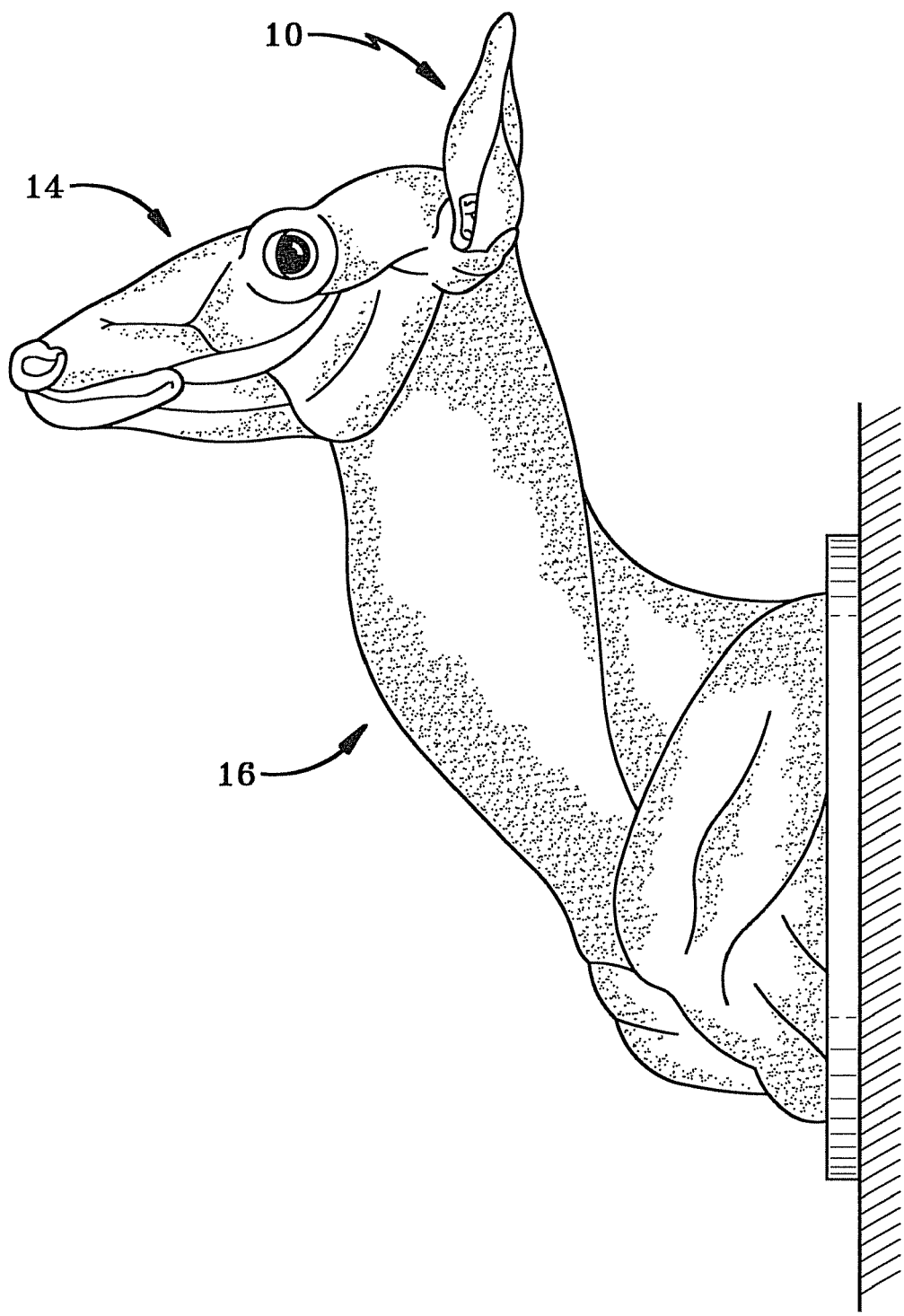
FIG. 1 is a side profile view of a taxidermy mannequin with an animal skin secured thereon to form a finished animal mount.

As shown in FIGS. 3, 7, and 8, ear liner 24 includes a first portion 60, a second portion 62, and a second mount connector 64 proximate second portion 62. Second mount connector 64 is shown particularly in the preferred embodiment having male elements and proximate second portion 62, and comprising a rod 66 extending from second portion 62 with a generally spherical joinder element 68 affixed thereto. First portion 60 includes an ear recess 70 forming a pocket 72 proximate second portion 62. As shown in FIGS. 1-3, featured surface insert 22 includes a first side 74 and a second side 76, and is sized to fit in pocket 72 with second side 76 abutting the surface of ear liner 24 in pocket 72 and first side 74 facing outwardly.

In operation, a taxidermist either selects taxidermy mannequin 16 having ear engagement area 12 previously formed, or the taxidermist may form ear engagement area 12 by shaving down a flat area proximate the anatomically correct position for an animal ear, creating holes 28 for screws 30, and forming is recess 26. After ear engagement area 12 is formed, the taxidermist will secure lock plate 18 thereto. Lock plate 18 is secured to ear engagement area by screws 30 passing through holes 32 and into holes 28 where they are frictionally retained. First side 33 of lock plate 18 is secured proximate ear engagement area 12, while second side 35 of lock plate 18 faces outwardly from taxidermy mannequin 16. This positions angled surface 42 and angled surface 44 proximate recess 26. As shown in FIG. 7, this further positions angled surface 46 facing outwardly to complementarily receive screws 30 and retain the outermost portion of screws 30 therein to maintain an even surface on second side 35 of lock plate 18.

After lock plate 18 is secured to head portion 14 of taxidermy mannequin 16, the taxidermist inserts first portion 60 of ear liner 24 into an animal ear skin by any means common in the art to simulate the firm cartilage of an animal ear as understood in the art. As seen in FIGS. 1 and 2, first portion 60 of ear liner 24 is generally ear shaped and formed to match the anatomical shape of the particular animal the taxidermist is modeling. First portion 60 of ear liner 24 supports the skin of the tip of the animal ear, and wraps into ear recess 70, while second portion 62 and second mount connector 64 do not directly support the animal ear skin.

When the taxidermist is satisfied that the animal ear skin is sufficiently secured and modeled upon first portion 60 of ear liner 24 the taxidermist engages ear liner 24 with ear butt 20 by the following method. As shown in FIGS. 7 and 8, the taxidermist inserts second mount connector 64 into channel 54 at second side 58 and presses ear liner 18 until second mount connector 64 extends outwardly from first side 56 of ear butt 20; second portion 62 resides in channel 54 generally abutting inner surface 52; and first portion 60 extends outwardly from second side 58 of ear butt 20. As shown in FIG. 8, the contours of inner surface 52 complement the shape of second portion 62 to provide a fitted abutment.

After ear butt 20 is properly fitted to ear liner 24, ear liner 24 is secured to lock plate 18 by engaging second mount connector 64 with first mount connector 34. As shown particularly in the preferred embodiment in FIGS. 4-8, second mount connector 64 is comprised of rod 66 and joinder element 68, which extend outwardly from second portion 62. First mount connector 34 is a keyhole slot comprised of first and second aperture 36 and 38, respectively, and rail aperture 40 extending therebetween. To secure ear liner 24 to lock plate 18, the taxidermist inserts joinder element 68 into first aperture 36. First aperture 36 is sized to allow joinder element 68 to pass therethrough and into recess until rod 66 resides within first aperture 36. The taxidermist then moves ear liner 24 so that rod 66 slides along angled surface 44 within rail aperture 40 and into second aperture 38. Second aperture 38 is sized to disallow joinder element 68 to pass therethrough, thus holding ear liner 24 engaged with lock plate 18.

As shown in FIG. 8, angled surface 42 surrounding second aperture 38 is sized to complementarily receive a leading edge 78 of joinder element 68 and prevent joinder element 68 and rod 66 from inadvertently slipping into rail aperture 40 and further into first aperture 36 where ear liner 24 may disengage with lock plate 18. When engaged, ear liner 24 acts to hold ear butt 20 pressed against lock plate 18, thereby pinning ear butt 20 between ear liner 24 and lock plate 18. When second mount connector 64 is engaged with first mount connector 34, joinder element 68 resides in recess 26 and frictionally holds ear liner 24 and ear butt 20 to lock plate 18, thereby providing a releasable connection between modular taxidermy ear system 10 and head portion 14 of taxidermy mannequin 16. First and second mount connectors 34 and 64, respectively, are shown in the preferred embodiment having apertures 36, 38, and 40, rod 66, and joinder element 68, however, mount connectors 34 and 36 may be formed having any similar connection elements and styles, including a snap fit, press fit, or frictional engagement.

After ear liner 24 is satisfactorily engaged with lock plate 18, the taxidermist continues to mount the animal skin onto head portion 14 of taxidermy mannequin 16 in any means common in the art. As shown in FIG. 8, ear butt 20 includes outer surface 50 which is contoured and complementarily formed to provide an anatomically accurate base for the animal ear skin when second mount connector 64 is engaged with first mount connector 34.

At any desired point in the taxidermy process after ear liner 24 is engaged with lock plate 18 the taxidermist may insert featured surface insert 22 into pocket 72 of ear liner 24. When featured surface insert 22 is fitted into pocket 72, first side 74 faces outwardly to display contoured and anatomically correct surface features to simulate the anatomically correct projections of the inner ear cartilage of an animal, such as the concha, tragus, antitragus. Second side 74 of featured surface insert 22 fittably abuts the surface of ear liner 24 which forms pocket 72 and is frictionally held therein.

After ear liner 24, ear butt 20, and lock plate 18 are engaged to secure modular taxidermy ear system 10 to head portion 14 of taxidermy mannequin 16, the taxidermist may finish building the animal model using any method common in the art. Ear liner 24 is firmly secured to head portion 14 and is not susceptible to the common forms of degradation such as loss of adhesion for adhesive or clay-based affixation methods. Furthermore, ear liner 24 may be easily disengaged from lock plate to adjust the positioning of particular elements or the animal skin itself.

A main feature of the present invention is the ability of the taxidermist to efficiently configure the ear placement on the animal model from the formation of outer surface 50 and second side 58 of ear butt 20 and channel 54 extending therethrough. As shown in FIG. 2, outer surface 50 and second side 58 of ear butt 20 is formed to position ear liner 24 in a particular orientation 80, wherein ear recess 70 of first portion 60 is facing the same direction as head portion 14 of taxidermy mannequin 16. The opening of channel 54 proximate second side 58 requires ear liner 24 to face in orientation 80 to be fittably received therein.

As shown in FIG. 9, a second ear butt 82 is formed to position ear liner 24 in a different orientation 84 when viewed in relation to orientation 80. A channel (not shown) opening proximate a second side 88 of ear butt 82 positions ear liner 24 in orientation 84, wherein ear recess 70 faces away from the direction head portion 14 of taxidermy mannequin 16 is facing. The opening of the channel of ear butt 82 requires ear liner 24 to face in orientation 84 to be fittably received therein. Thus, using a single ear liner 24 and a single lock plate 18, the taxidermist may support ear skin in different orientations 80 and 84 by selecting either ear butt 20 and 82, respectively, to provide a desired position of the animal ear skin. Ear butt 20 and 82 may be formed to give ear liner 24 any position relative head portion 14. This allows the taxidermist to customize and tailor modular taxidermy ear system 10 to conform to the particular animal skin and desired finished animal model.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the invention is an example and the invention is not limited to the exact details shown or described.

The invention claimed is:

1. A taxidermy mannequin comprising:
an ear engagement area formed on a head portion;
a lock plate having a female first mount connector and positioned adjacent to the ear engagement area;
an ear liner adapted to support an animal ear skin of an animal ear; and
a male second mount connector extending from the ear liner and formed to engage the first mounting connector to secure the ear liner to the lock plate.

2. The taxidermy mannequin of claim 1, wherein the ear liner may be rotated about the second mount connector to position the ear liner in different orientations relative the head portion.

3. The taxidermy mannequin of claim 1, wherein the ear liner comprises:
a first portion;
a second portion proximate the first portion, and defining a pocket therein; and
wherein the second mount connector extends from the second portion.

4. The taxidermy mannequin of claim 3, further comprising a featured surface insert adapted to simulate portions of the animal ear, wherein the featured surface insert is fittably received in the pocket formed in the second portion of the ear liner.

5. The taxidermy mannequin of claim 3, further comprising an ear butt defining a channel therein, wherein the second portion is in the channel when the second mount connector is engaged with the first mount connector.

6. The taxidermy mannequin of claim 5, wherein the ear butt includes a flat surface, an outer contoured surface, and an inner surface defining the channel, wherein the outer contoured surface is adapted to support an animal skin and form an anatomically accurate base for the animal ear skin when the second mount connector is engaged with the first mount connector.

7. The taxidermy mannequin of claim 1, wherein the first mount connector comprises a mount aperture defined by the lock plate, whereby the second mount connector engages the first aperture to secure the ear liner to the locking member.

8. The taxidermy mannequin of claim 7, further including a recess formed in the ear engagement area, wherein the recess is sized to receive the joinder element therein when the second mount connector is engaged with the first mount connector.

9. The taxidermy mannequin of claim 7, wherein the second mount connector comprises a rod extending from the second portion of the ear liner and a joinder element affixed to the rod, wherein the joinder element and rod mate with the mount aperture to secure the ear liner to the locking member.

10. The taxidermy mannequin of claim 9, wherein the mount aperture comprises a keyhole slot having a first aperture, a second aperture, and a rail aperture extending therebetween, wherein the first aperture is sized to allow the joinder element to pass therethrough, the second aperture is sized to disallow the joinder element to pass therethrough, and the rail aperture is sized to disallow the joinder element to pass therethrough and sized to allow the rod to move therein.

11. The taxidermy mannequin of claim 10, wherein the lock plate includes a first side and a second side, wherein the first side is generally flat and abuts the ear engagement area when the lock plate is secured to the ear engagement area.

12. A modular taxidermy ear system comprising:
a lock plate having a first mount connector;
an ear liner and adapted to support an animal ear skin;
a second mount connector extending from the ear liner and formed to engage the first mounting connector to secure the ear liner to the lock plate.

13. The modular taxidermy ear system of claim 12, wherein the ear liner may be rotated about the second mount connector to position the ear liner in different orientations relative the head portion.

14. The modular taxidermy ear system of claim 12, wherein the ear liner comprises:
a first portion;
a second portion proximate the first portion, and defining a pocket therein; and
wherein the second mount connector extends from the second portion.

15. The modular taxidermy ear system of claim 12, further comprising a first ear butt, wherein the first ear butt defines a channel therethrough and the second portion of the ear liner is located within the channel when the second mount connector is engaged with the first mount connector, and wherein the ear liner extends outwardly from the first ear butt in a first orientation.

16. The modular taxidermy ear system of claim 15, further comprising a second ear butt, wherein the second ear butt defines a channel therethrough and the second portion of the ear liner is located within the channel when the second mount connector is engaged with the first mount connector, wherein the ear liner extends outwardly away from the second ear butt in a second orientation, and wherein the first and second ear butt are selectable within the modular taxidermy ear system to achieve the first and second orientation, respectively.

17. The modular taxidermy ear system of claim 12, wherein the first mount connector comprises a mount aperture defined by the lock plate, whereby the second mount connector engages the first aperture to secure the ear liner to the locking member.

18. The modular taxidermy ear system of claim 17, wherein the second mount connector comprises a rod extending from the second portion of the ear liner and a joinder element affixed to the rod, wherein the joinder element and rod mate with the mount aperture to secure the ear liner to the locking member.

19. The modular taxidermy ear system of claim 18, wherein the mount aperture comprises a keyhole slot having a first aperture, a second aperture, and a rail aperture extending therebetween, wherein the first aperture is sized to allow the joinder element to pass therethrough, the second aperture is sized to disallow the joinder element to pass therethrough, and the rail aperture is sized to disallow the joinder element to pass therethrough and sized to allow the rod to move therein.

20. A method of forming an ear support structure for a taxidermy mannequin, wherein the method comprises:
   positioning a lock plate having a female first mount connector adjacent an ear engagement area of a head portion of the taxidermy mannequin; and
   engaging a male second mount connector formed on an ear liner with the first mount connector to secure the ear liner to the head portion.

21. The method of forming the ear support structure of claim 20, wherein the step of engaging the second mount connector with the first mount connector further comprises:
   selecting an ear butt from a plurality of differently shaped ear butts;
   extending the ear liner partially through a channel defined by an ear butt whereby the second mount connector extends outwardly from the channel; and
   engaging the second mount connector with the first mount connector to secure the ear liner and the ear butt to the head portion.

* * * * *